(12) United States Patent
Desai et al.

(10) Patent No.: US 10,869,280 B2
(45) Date of Patent: Dec. 15, 2020

(54) MANAGING COVERAGE AREAS PROVIDED BY DENSELY-ARRANGED WIRELESS ENDPOINT DEVICES WITH DIRECTIONAL ANTENNAS

(71) Applicant: Cisco Technology, Inc., San Jose, CA (US)

(72) Inventors: Vishal Satyendra Desai, San Jose, CA (US); Indermeet Singh Gandhi, Bangalore (IN); Jerome Henry, Pittsboro, NC (US); Robert Edgar Barton, Richmond (CA)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/120,270

(22) Filed: Sep. 2, 2018

(65) Prior Publication Data
US 2020/0077347 A1   Mar. 5, 2020

(51) Int. Cl.
*H04W 52/24* (2009.01)
*H04W 24/10* (2009.01)
(Continued)

(52) U.S. Cl.
CPC ........... *H04W 52/244* (2013.01); *H04W 4/08* (2013.01); *H04W 16/14* (2013.01); *H04W 24/10* (2013.01);
(Continued)

(58) Field of Classification Search
CPC .................................................. H04W 52/244
See application file for complete search history.

(56) References Cited

U.S. PATENT DOCUMENTS 9,820,162 B2    11/2017  Wang et al.
9,942,193 B1 *   4/2018  Chu .................... H04L 61/2038
(Continued)

FOREIGN PATENT DOCUMENTS

WO        2016112306 A1    7/2016

OTHER PUBLICATIONS

Li Zheng et al., "Overlapping Impacts and Resource Coordination for High-density Wireless Communication", 2009 IEEE-RIVF International Conference on Computing and Communication Technologies, https://ieeexplore.ieee.org/document/5174653/, Jul. 13-17, 2009, 7 pages.
(Continued)

*Primary Examiner* — Ankur Jain (57) ABSTRACT

The method comprises, at a multiple endpoint power level orchestrator, assigning a first group identifier to a first endpoint device and assigning a second group identifier to a second endpoint device. The first endpoint device includes a first directional antenna and the second endpoint device includes a second directional antenna. Moreover, the first directional antenna provides a first coverage area and the second directional antenna provides a second coverage area. Additionally, the first and second coverage areas provide an overlapping coverage area. The method further includes obtaining a first collision report including the first group identifier from the first endpoint device and obtaining a second collision report including the second group identifier from the second endpoint device. The method further includes providing respective transmission power level adjustments to one or more of the first or second endpoint devices according to satisfaction of a performance metric.

20 Claims, 8 Drawing Sheets

(51) Int. Cl.
    H04W 52/42    (2009.01)
    H04W 4/08     (2009.01)
    H04W 16/14    (2009.01)
    H04W 74/08    (2009.01)
    H04W 72/04    (2009.01)
    H04W 52/34    (2009.01)
(52) U.S. Cl.
    CPC ........... *H04W 52/34* (2013.01); *H04W 52/42* (2013.01); *H04W 72/046* (2013.01); *H04W 74/0825* (2013.01)

(56) References Cited

U.S. PATENT DOCUMENTS

| | | |
|---|---|---|
| 2008/0056201 A1 | 3/2008 | Bennett |
| 2015/0146543 A1* | 5/2015 | Diener .................. H04W 52/40 370/248 |
| 2016/0345258 A1 | 11/2016 | Zhou et al. |
| 2018/0110046 A1 | 4/2018 | Patil et al. |

OTHER PUBLICATIONS

M. Shahwaiz Afaqui et al., "IEEE 802.11AX: Challenges and Requirements for Future High Efficiency Wifi", Digital Object Identifier: 10.1109/MWC.2016.1600089WC, IEEE Wireless Communications, https://ieeexplore.ieee.org/document/7792393, Jun. 2017, 8 pages.

Josip Lorincz et al., "Optimized network management for energy savings of wireless access networks", https://www.sciencedirect.com/science/article/pii/S138912861000304X, Apr. 16, 2010, 27 pages.

* cited by examiner

MANAGING COVERAGE AREAS PROVIDED BY DENSELY-ARRANGED WIRELESS ENDPOINT DEVICES WITH DIRECTIONAL ANTENNAS

TECHNICAL FIELD

The present disclosure generally relates to routing network traffic, and in particular, to managing coverage areas provided by densely-arranged wireless endpoint devices with directional antennas.

BACKGROUND

The ever-increasing number of client devices and corresponding demand for wireless network connectivity has resulted in network deployments including densely-arranged endpoint devices (e.g., many endpoint devices in a small space). Each endpoint device provides a respective coverage area, and when endpoint devices are densely arranged there is often an overlap of two or more respective coverage areas. Accordingly, a given client device may be in a physical space covered by the overlapping coverage area provided by two or more endpoint devices. Although some overlap is desirable to adequately cover the physical space, too much overlap leads to degradation of performance experienced by client devices within the overlapping coverage area.

Current systems utilize communications between endpoint devices in order to manage respective coverage areas provided by the endpoint devices. However, these current systems are ineffective in managing the respective coverage areas when the endpoint devices have directional antennas because these endpoint devices often cannot detect and therefore communicate with one another.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Various implementations disclosed herein include devices, systems, and methods for managing coverage areas provided by densely-arranged wireless endpoint devices with directional antennas. These implementations ameliorate and/or resolve a number of technical problems resulting from deficiencies in current systems, such as current radio resource management (RRM) systems.

The ever-increasing number of client devices and corresponding demand for wireless network connectivity entails densely-arranged endpoint devices, such as Wi-Fi access points. Because of the proximity of these endpoint devices, the respective coverage areas provided by the endpoint devices often overlap with one another. A client device in the overlapping coverage area is likely to experience coverage interference with respect to the signals provided by the endpoint devices. This coverage interference leads to a degradation of performance (e.g., throughput) experienced by the client device. Moreover, when the endpoint devices are densely arranged, as is increasingly the case, the endpoint devices often provide respective coverage areas via one or more common channels due to the limited number of available channels. Accordingly, a client device in the overlapping coverage area may experience co-channel contention with respect to the endpoint devices providing the overlapping coverage area. This co-channel contention further degrades the performance experienced by the client device.

Current RRM systems cannot effectively manage respective coverage areas provided by directional antennas included at respective proximate endpoint devices. Current RRM systems rely on status-information communicated between proximate endpoint devices. However, proximate endpoint devices equipped with respective directional antennas often cannot detect and thus communicate with each other. Consequently, current RRM systems lack the information for providing helpful coverage area adjustment instructions to these endpoint devices. Current RRM systems, therefore, struggle to reduce the degradation of performance experienced by client devices in an overlapping coverage area provided by the endpoint devices. The implementations disclosed herein address these deficiencies of the current RRM systems.

The method disclosed herein comprises, at a multiple endpoint power level orchestrator, assigning a first group identifier to a first endpoint device and assigning a second group identifier to a second endpoint device. The first endpoint device includes a first directional antenna and the second endpoint device includes a second directional antenna. Moreover, the first directional antenna provides a first coverage area and the second directional antenna provides a second coverage area. Additionally, the first and second coverage areas provide an overlapping coverage area. According to various implementations, the first endpoint device is outside of the second coverage area and the second endpoint device is outside of the first coverage area. The method further includes obtaining a first collision report including the first group identifier from the first endpoint device and obtaining a second collision report including the second group identifier from the second endpoint device. The method further includes providing respective transmission power level adjustments to one or more of the first or second endpoint devices according to satisfaction of a performance metric.

In accordance with some implementations, a multiple endpoint power level orchestrator includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a multiple endpoint power level orchestrator, cause the multiple endpoint power level orchestrator to perform or cause performance of any of the methods described herein. In accordance with some implementations, a networking includes: one or more processors, a non-transitory memory, and means for performing or causing performance of any of the methods described herein.

Example Embodiments

In accordance with various implementations disclosed herein, a multiple endpoint power level orchestrator assigns respective group identifiers (e.g., 802.11ax color designations) to endpoint devices, such as IEEE 802-based access points (e.g., Wi-Fi access point). The endpoint devices collectively provide an overlapping coverage area to one or more client devices. The multiple endpoint power level orchestrator obtains, from the endpoint devices, respective collision reports that include the respective group identifiers. In some implementations, the client devices generate respective collision reports that indicate the extent to which the corresponding client device is in the overlapping coverage area. In some implementations, a respective collision report is generated per wireless channel. In some implementations, collision reports are generated across one or more wireless channels, with at least some of the endpoint devices using different wireless channels.

In response to obtaining the respective collision reports, the multiple endpoint power level orchestrator adjusts the transmission power of one or more of the endpoint devices in order to satisfy a performance metric. For example, the performance metric is satisfied when there is a balance between the number of collision reports generated by the client devices and respective strengths of signals received at the client devices (e.g., receive power). In some implementations, the multiple endpoint power level orchestrator deliberately instructs the endpoint devices to provide wireless coverage via a common channel in order to induce the client devices to generate collision reports.

Figure 1A:
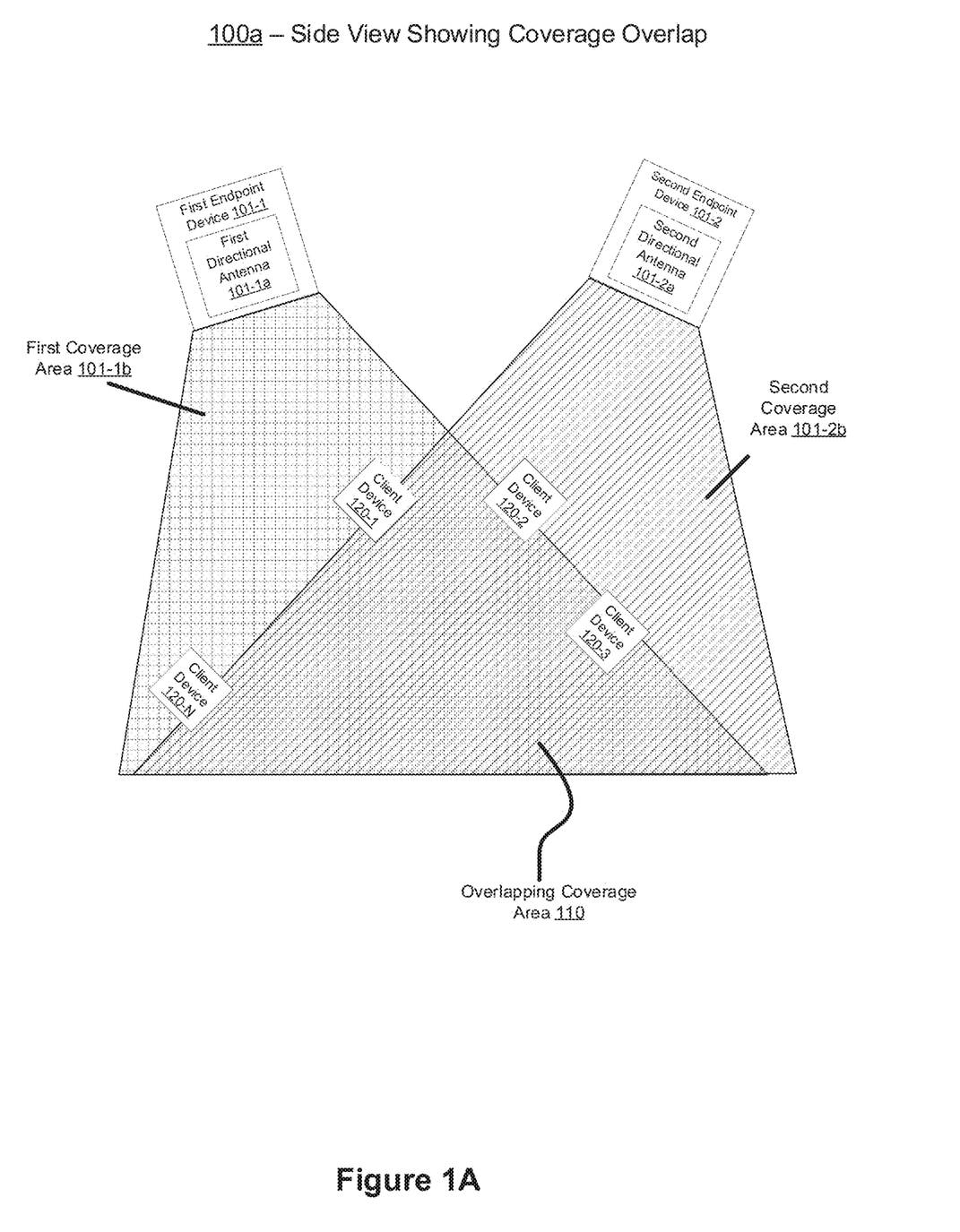
FIG. 1A is an example of a side view of a networking environment including directional antennas providing an overlapping coverage area in accordance with some implementations.

FIG. 1A is an example of a side view of a networking environment 100a including directional antennas providing an overlapping coverage area in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the networking environment 100a includes a first endpoint device 101-1 equipped with a first directional antenna 101-1a and a second endpoint device 102-1 equipped with a second directional antenna 101-2a. In some implementations, the first and second endpoint devices 101-1 and 101-2 correspond to respective access points, such as Wi-Fi access points. The first directional antenna 101-1a provides a first coverage area 101-1b, while the second directional antenna 101-2a provides a second coverage area 101-2b.

the first and second directional antennas 101-1a and 101-2a provided respective coverage area signals 101-1b and 101-2b each of a directed nature. This is in contrast to an omnidirectional antenna, which provides coverage approximately equally in all directions. As illustrated in FIG. 1A, the first endpoint device 101-1 is outside of the second coverage area 101-2b and the second endpoint device 101-2 is outside of the first coverage area 101-1b. As a result, the first and second endpoint devices 101-1 and 101-2 are unable to detect and therefore communicate with each other. The inability of the first and second endpoint devices 101-1 and 101-2 to detect each other renders current RRM systems, which assume a line of communication between the endpoint devices, ineffective in controlling respective coverage areas provided by the endpoint device devices.

As further illustrated in FIG. 1A, the first and second coverage areas 101-1b and 101-2b have an overlapping coverage area 110. The overlapping coverage area 110 provides wireless service to client devices 120-1-120-N. In some implementations, the client devices 120-1-120-N include one or more of: mobile phone, smart phone, tablet, laptop, IoT sensor, AR/VR device, and/or the like. The client devices 120-1-120-N, which are in the overlapping coverage area 110, each experiences a degradation of performance due to channel interference with respect to the first and second endpoint device 101-1 and 101-2.

For example, as is illustrated in FIG. 1A, the client device 120-1 resides in both the first and second coverage areas 101-1b and 101-2b. In the event the first and second endpoint devices 101-1 and 101-2 provide respective coverage (e.g., service) to the client device 120-1 via a common channel (e.g., "Channel 1"), the client device 120-1 experiences co-channel contention. For instance, the co-channel contention corresponds to the client device 120-1 receiving conflicting information (e.g., data frames, management frames, and/or control frames) over the common channel from the first and second endpoint devices 101-1 and 101-2. Consequently, the client device 120-1 experiences a degradation of performance.

Figure 1B:
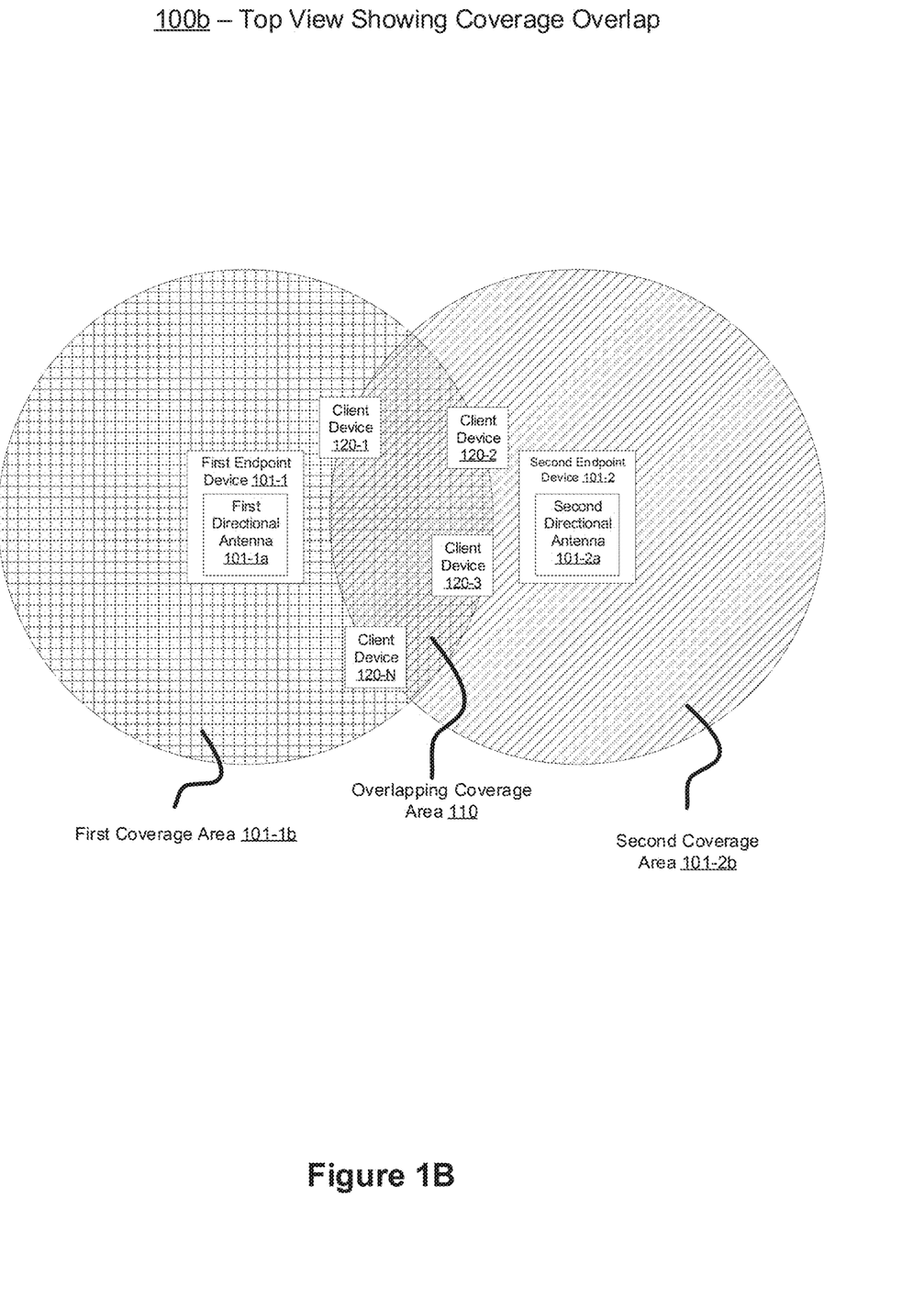
FIG. 1B is an example of a top view of a networking environment including directional antennas providing an overlapping coverage area in accordance with some implementations.

FIG. 1B is an example of a top view of a networking environment 100b including directional antennas providing an overlapping coverage area in accordance with some implementations. FIG. 1B is an illustration of a top view of the networking environment 100a that is illustrated from a side view in FIG. 1A. The first and second endpoint devices 101-1 and 101-2 cannot detect one another due to the directional nature of the respective provided coverage area, as described above with respect to FIG. 1A. Accordingly, current RRM systems cannot effectively reduce the overlapping coverage area 110. As a result, the client devices 120-1-120-N experience degradation of performance resulting from (e.g., excessive) coverage interference.

An example of coverage interference is co-channel contention, in which a particular client device is being provided wireless coverage by two or more endpoint devices via respective a common wireless channel (e.g., wireless channel having the same frequency characteristics, such as being in the same frequency band). For example, with reference to FIG. 1B, the first and second endpoint devices 101-1 and 101-2 may provide wireless coverage to the client device 120-3 via "Channel 1," which, for example, corresponds to 2412 Mhz. As a result, the client device 120-3 may receive conflicting data over "Channel 1" and thus experiences performance degradation, such as a reduction in throughput.

Figure 1C:
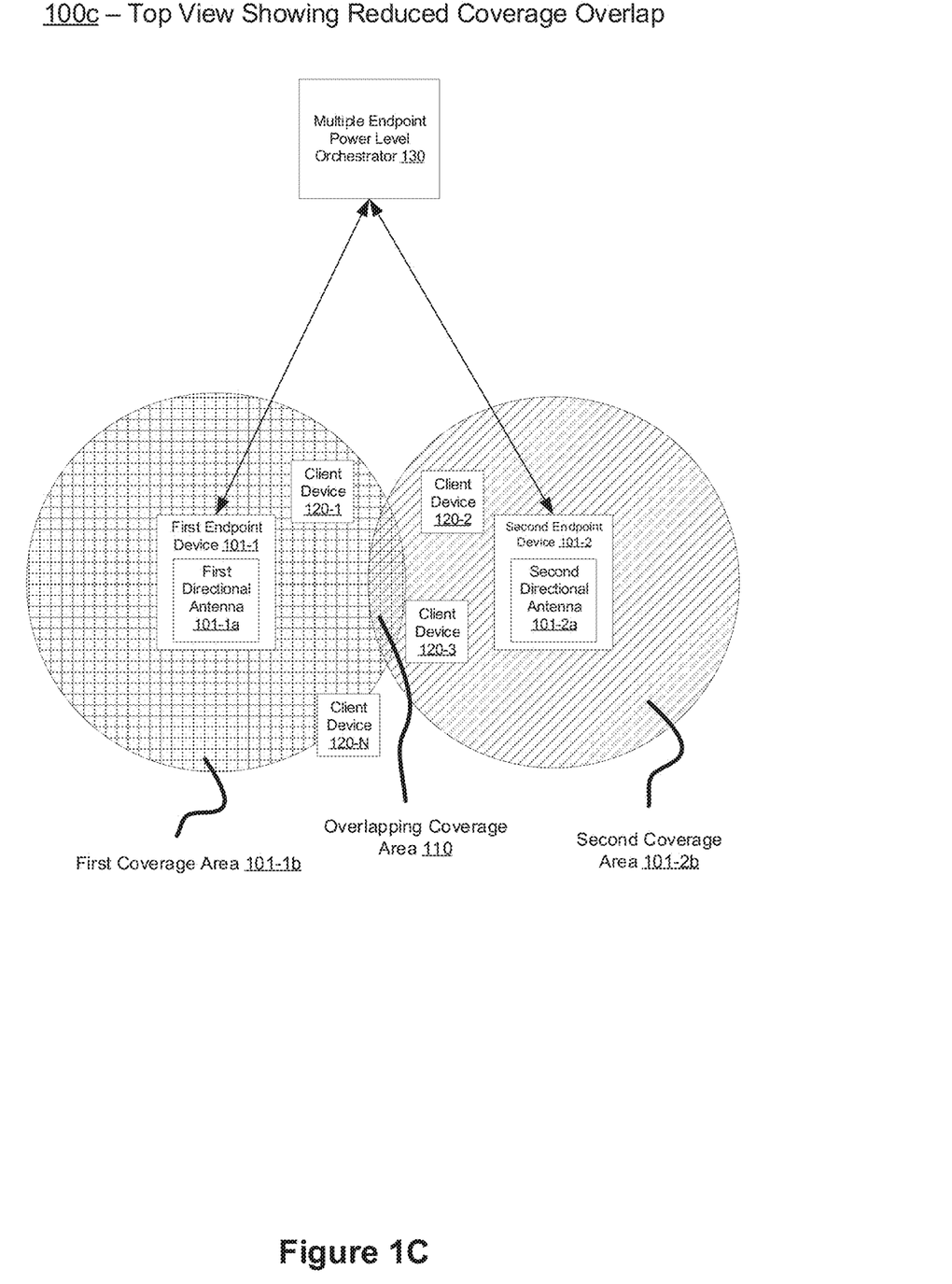
FIG. 1C is an example of a top view of a networking environment including directional antennas providing a reduced overlapping coverage area in accordance with some implementations.

FIG. 1C is an example of a top view of a networking environment 100c including directional antennas providing a reduced overlapping coverage area in accordance with some implementations. As illustrated in the networking environments 100a and 100b in FIGS. 1A and 1B, the networking environment 100c includes a first endpoint device 101-1 equipped with a first directional antenna 101-1a and a second endpoint device 102-1 equipped with a second directional antenna 101-2a. The first and second directional antennas 101-1a and 101-2a provide an overlapping coverage area 110 in which client devices 120-1-120-N reside. One of ordinary skill in the art will appreciate that the networking environment 100c may include any number of endpoint devices and client devices.

The networking environment 100c additionally includes a multiple endpoint power level orchestrator 130. In some implementations, the multiple endpoint power level orchestrator 130 corresponds to a wireless LAN controller (WLC). In some implementations, the multiple endpoint power level orchestrator 130 corresponds to or is included within an intent-based networking system, such as Cisco's digital network architecture (DNA). In various implementations, although not depicted in the networking environment 100c, the multiple endpoint power level orchestrator 130 corresponds to an improved RRM system that resides at one or more of the first and second endpoint devices 101-1 and 101-2 (e.g., a distributed system). For example, in some implementations, the multiple endpoint power level orchestrator 130 is included within one or more 802.11ax access points.

As will be detailed below, the multiple endpoint power level orchestrator 130 provides respective transmission power level adjustments to one or more of the first or second endpoint devices 101-1 and 101-2 according to satisfaction of a performance metric. As a result, one or more of the respective first and second coverage areas 101-1b and 101-2b are reduced in size, reducing the amount of coverage interference experienced by the client devices 120-1-120-N. For example, the multiple endpoint power level orchestrator 130 reduces the overlapping coverage area 110 in FIG. 1C with respect to the overlapping coverage area 110 in FIG. 1B. Consequently, as illustrated in the networking environment 100c in FIG. 1C, the endpoint devices 120-1, 120-3, and 120-N each resides in a single coverage area and thus experiences less coverage interference as compared with the networking environment 100b in FIG. 1B. For example, the endpoint devices 120-1, 120-3, and 120-N experience less co-channel contention. One of ordinary skill in the art will appreciate that in some implementations including more than two endpoint devices, the multiple endpoint power level orchestrator 130 reduces the number of coverage areas in which a particular endpoint device resides, even though this number may be greater than one.

Figure 2:
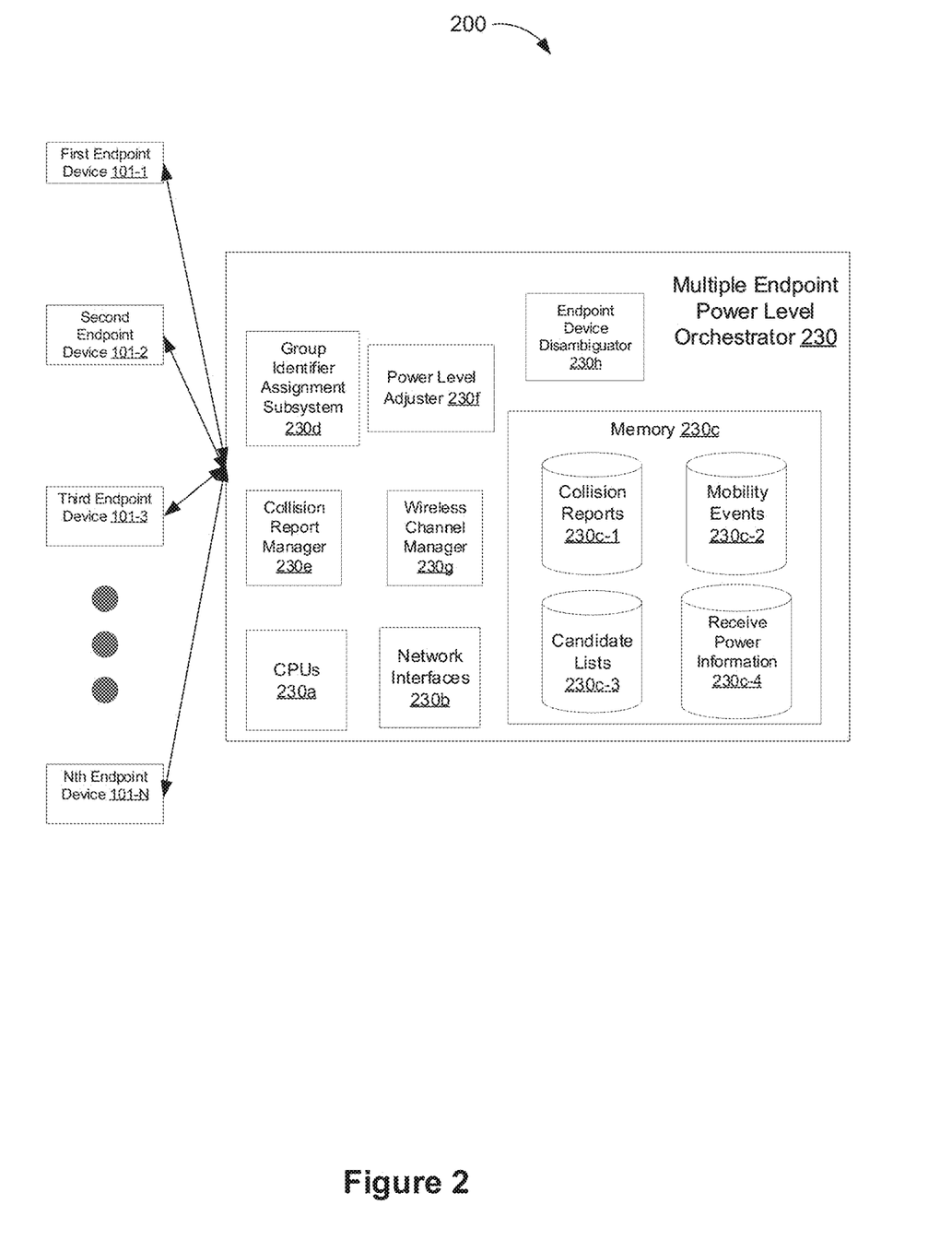
FIG. 2 is a block diagram of an example of a multiple endpoint power level orchestrator in accordance with some implementations.

FIG. 2 is a block diagram 200 of an example of a multiple endpoint power level orchestrator 230 in accordance with some implementations. In various implementations, the multiple endpoint power level orchestrator 230 is similar to and adapted from a multiple endpoint power level orchestrator 130 in FIG. 1C. The multiple endpoint power level orchestrator 230 functions to managing coverage areas provided by densely-arranged wireless endpoint devices equipped with directional antennas. To that end, the multiple endpoint power level orchestrator 230 includes one or more CPUs 230a that provide processing resources. The multiple endpoint power level orchestrator 230 further includes network interfaces 230b including input and output interfaces for communicating with endpoint devices 101-1-101-N. The multiple endpoint power level orchestrator 230 further includes a memory 230c (e.g., a non-transitory memory, such as RAM, ROM, etc.) that provides storage resources.

The multiple endpoint power level orchestrator 230 further includes a group identifier assignment subsystem 230d to assign a first group identifier to a first endpoint device 101-1 and assign a second group identifier to a second endpoint device 101-2. The first endpoint device 101-1 includes a first directional antenna (e.g., the first directional antenna 101-1a in FIG. 1C) and the second endpoint device 101-2 includes a second directional antenna (e.g., the second directional antenna 101-2a in FIG. 1C). The first directional antenna provides a first coverage area and the second directional antenna provides a second coverage area. The first and second coverage areas provide an overlapping coverage area.

The multiple endpoint power level orchestrator 230 further includes a collision report manager 230e to obtain a first collision report including the first group identifier from the first endpoint device 101-1 and obtain a second collision report including the second group identifier from the second endpoint device 101-2.

The multiple endpoint power level orchestrator 230 further includes a power level adjuster 230f to provide respective transmission power level adjustments to one or more of the first endpoint device 101-1 or the second endpoint device 101-2 according to satisfaction of a performance metric. In some implementations, the multiple endpoint power level orchestrator 230 determines that the performance metric is satisfied when collision information (e.g., the first and second collision reports) and receive power information concerning the client devices collectively satisfy a coverage area condition. In various implementations, the multiple endpoint power level orchestrator 230 stores the first and/or second collision reports in a collision reports datastore 230c-1 allocated in the memory 230c. In various implementations, the multiple endpoint power level orchestrator 230 stores receive power information (e.g., receive power levels of signals received at client devices, retry request rate information obtained from endpoint devices, etc.) in a receive power information datastore 230c-4 allocated in the memory 230c.

In various implementations, the multiple endpoint power level orchestrator 230 further includes a wireless channel manager 230g. In some implementations, the wireless channel manager 230g instructs the first and second endpoint devices 101-1 and 101-2 to provide at least respective portions of the first and second coverage areas (e.g., the first and second coverage areas 101-1b and 101-2b in FIG. 1C) via a common wireless channel. In some implementations, the wireless channel manager 230g instructs the first and second endpoint devices 101-1 and 101-2 to provide portions of the respective first and second coverage areas via different wireless channels in response to satisfaction of the performance metric.

In various implementations, the multiple endpoint power level orchestrator 230 further includes an endpoint device discovery subsystem 230h to discover a plurality of proximate endpoint devices including the first and second endpoint devices 101-1-101-2. In some implementations, the endpoint device discovery subsystem 230h discovers the plurality of proximate endpoint devices based on one or more of the first collision report or the second collision report. In some implementations, the endpoint device discovery subsystem 230h discovers the plurality of proximate endpoint devices based on mobility event data associated with one or more client devices in the overlapping coverage area. For example, in some implementations, the multiple endpoint power level orchestrator 230 obtains, from endpoint devices, roaming history of client devices in the overlapping coverage area, and stores the roaming history in a mobility events datastore 230c-2 allocated in the memory 230c. In some implementations, the endpoint device discovery subsystem 230h discovers the plurality of proximate endpoint devices based on first and second wireless coverage characteristics characterizing with the first and second coverage areas, such as a particular endpoint device having a high loss rate. For example, in some implementations, the multiple endpoint power level orchestrator 230 obtains, from client devices, beacon reports and/or neighbor report information elements. In some implementations, the endpoint device discovery subsystem 230h discovers the plurality of proximate endpoint devices based on respective endpoint candidate lists generated at one or more client devices in the overlapping coverage area. In some implementations, the endpoint device discovery subsystem 230h stores the candidate list information in a candidate lists datastore 230c-3 allocated in the memory 230c.

In various implementations, the multiple endpoint power level orchestrator 230 further includes an endpoint device disambiguator 230i to disambiguate the plurality of proximate endpoint devices from each other and select a subset of the proximate endpoint devices for transmission power level adjustments. In some implementations, the endpoint device disambiguator 230i disambiguates the plurality of proximate devices discovered by the endpoint device discovery subsystem 230h. In some implementations, the endpoint device disambiguator 230i selects a subset of the disambiguated endpoint devices. For example, the endpoint device disambiguator 230i selects the first and second endpoint devices after disambiguating the plurality of proximate endpoint devices from each other.

Figure 3:
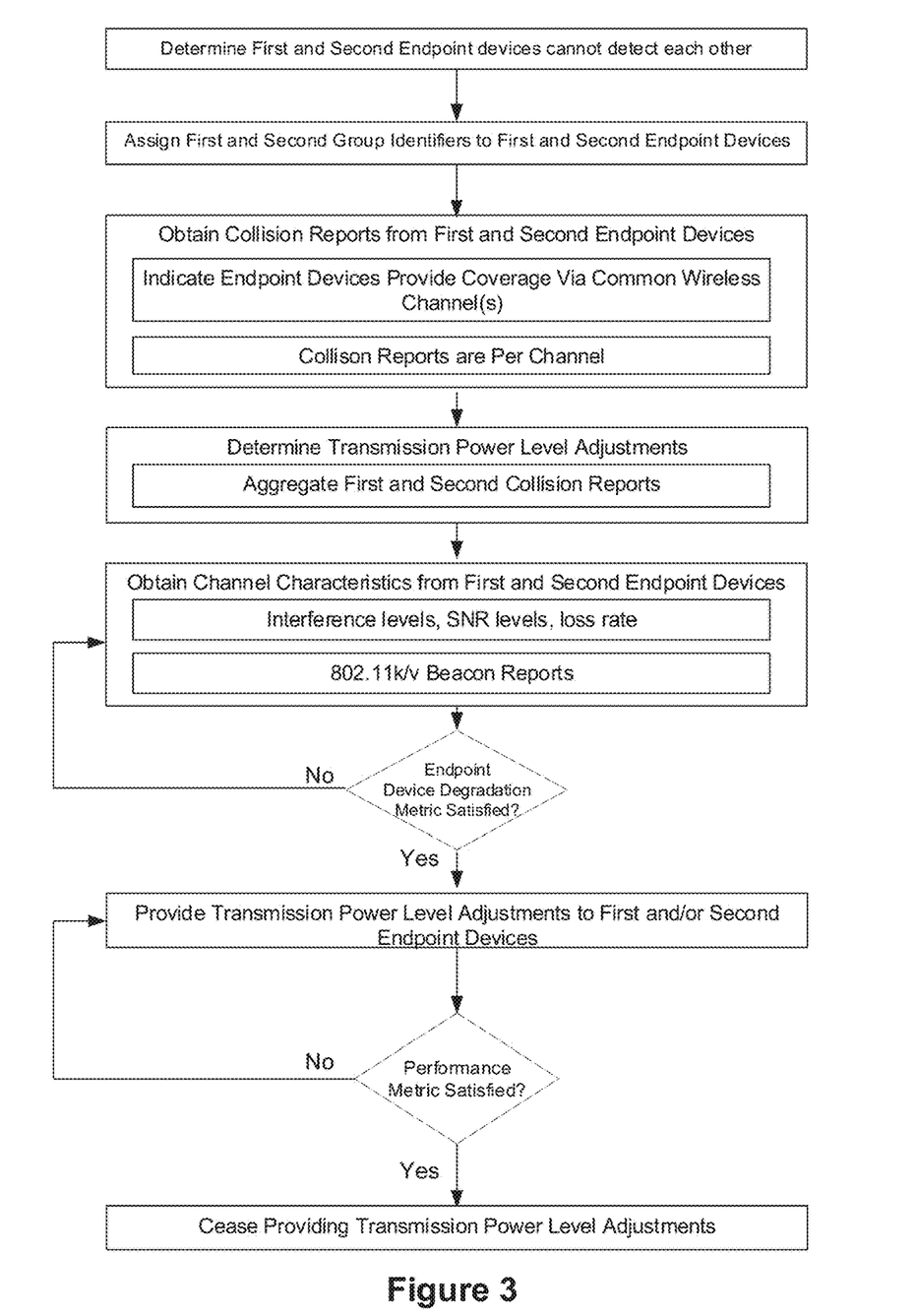
FIG. 3 is a flowchart representation of a method of managing an overlapping coverage area provided by directional antennas in accordance with some implementations.

FIG. 3 is a flowchart representation of a method 300 of managing an overlapping coverage area provided by directional antennas in accordance with some implementations. In various implementations, the method 300 is performed by a multiple endpoint power level orchestrator, such as the multiple endpoint power level orchestrator 130 in FIG. 1C or the multiple endpoint power level orchestrator 230 in FIG. 2. In some implementations, the method 300 is performed by an RRM system residing at one or more endpoint devices. In some implementations, some portions of the method 300 are performed at a multiple endpoint power level orchestrator while other portions are performed at one or more endpoint devices. Briefly, the method 300 includes assigning group identifiers to respective directional antenna-equipped first and second endpoint devices and providing transmission power level adjustments based on obtained collision reports in order to reduce the overlapping coverage area.

To that end, as represented by block 310, the method 300 includes assigning a first group identifier to a first endpoint device (e.g., the first endpoint device 101-1 in FIG. 1C) and assigning a second group identifier to a second endpoint device (e.g., the second endpoint device 101-2 in FIG. 1C). The first endpoint device includes a first directional antenna and the second endpoint device includes a second directional antenna. The first directional antenna providing a first coverage area and the second directional antenna providing a second coverage area. The first and second coverage areas provide an overlapping coverage area.

As represented by block 320, the method 300 includes obtaining a first collision report including the first group identifier from the first endpoint device and obtaining a second collision report including the second group identifier from the second endpoint device. As represented by block 320a, in some implementations, the client devices generate respective collision reports based on respective receive power levels, and the multiple endpoint power level orchestrator obtains these collision reports from the first and second endpoint devices. The respective power levels at which signals are received at the client devices indicate transmission power levels of respective directional antennas. In some implementations, the client devices generate the respective collision reports irrespective of the nature of the wireless channels (e.g., the channel number) with which the first and/or second endpoint devices provide connectivity to the client devices.

As represented by block 320b, in some implementations, the first and second collision reports are associated with the same wireless channel. In these implementations, the first and second endpoint devices transmit packets to one or more client devices via the same wireless channel. For example, with reference to FIG. 1C, the first and second endpoint device 101-1 and 101-2 provide coverage to the first client device 120-1 via a channel characterize by a frequency band of 2.4 Ghz (e.g., "Channel number 2"). In response, the first client device 120-1 generates and provides a collision report to the first endpoint device 101-1 (although alternatively it may have provided the collision report to the second endpoint device 101-2). The multiple endpoint power level orchestrator 130 obtains this collision report (the first collision report) from the first endpoint device 101-1.

As represented by block 330, in some implementations, the method 300 includes determining respective transmission power level adjustments for the first and second endpoint devices. For example, as represented by block 330a, in some implementations, determining the respective transmission power level adjustments includes aggregating the first and second collision reports in order to generate an aggregated collision report. Based on the aggregated collision report, the respective transmission power level adjustments are determined.

As represented by block 340, in some implementations, the method 300 includes obtaining, from the first and second endpoint devices, respective channel characteristics. For example, as represented by block 340a, in some implementations, the respective channel characteristics include one or more of inefficiency measurements such as interference level, loss rate, signal-to-noise ratio (SNR), and/or the like. In some implementations, as represented by block 340b, the respective channel characteristics are included within 802.11k neighbor and/or beacon reports, or 802.11v messages generated by endpoint devices and/or client devices.

As represented by block 350, in some implementations, the method 300 includes determining whether or not the respective channel characteristics satisfy an endpoint device degradation metric. In response to determining that the respective channel characteristics satisfy the endpoint device degradation metric, the method 300 proceeds to block 360. In response to determining that the respective channel characteristics do not satisfy the endpoint device degradation metric, the method 300 goes back to block 340. For example, the multiple endpoint power level orchestrator obtains (at block 340) a beacon report generated by a particular client device indicating a high data loss rate, and in response the multiple endpoint power level orchestrator provides transmission power level adjustments to one or more endpoint devices providing coverage to the particular client device.

As represented by block 360, the method 300 includes providing respective transmission power level adjustments to one or more of the first or second endpoint devices according to satisfaction of a performance metric. The nature of providing the respective transmission power level adjustments is detailed with reference to FIG. 4, below.

As represented by block 370, in some implementations, the method 300 includes determining whether or not the performance metric is satisfied. In response to determining that the performance metric is satisfied, the method 300 proceeds to block 380. In response to determining that the performance metric is not satisfied, the method 300 goes back to block 360. The nature of determining whether or not the performance metric is satisfied is detailed with reference to FIG. 4, below.

As represented by block 380, in some implementations, the method 300 includes ceasing to provide the respective transmission power level adjustments to one or more of the first or second endpoint devices in response to satisfaction of the performance metric.

Figure 4:
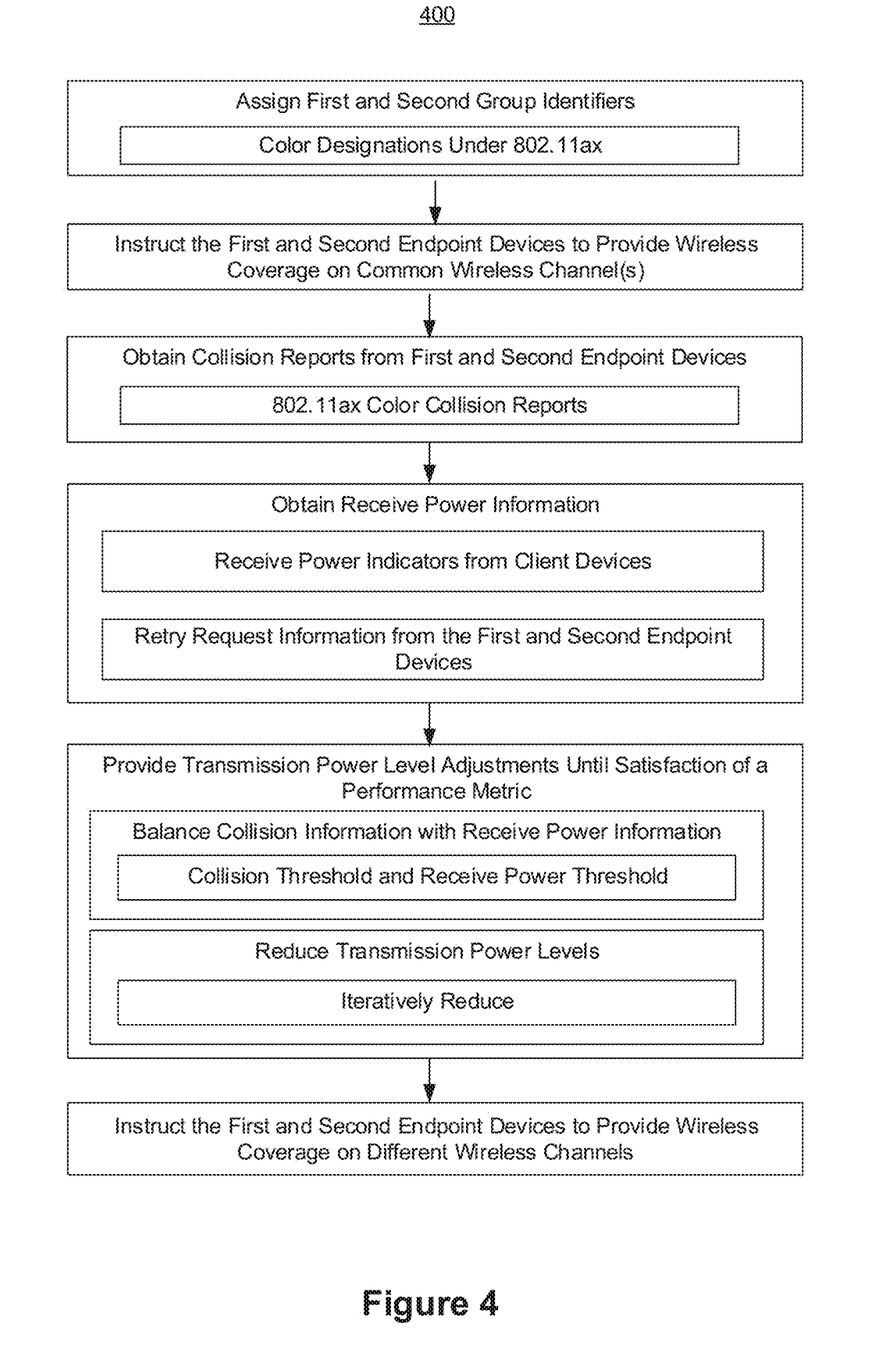
FIG. 4 is a flowchart representation of a method of managing an overlapping coverage area provided by directional antennas in accordance with some implementations.

FIG. 4 is a flowchart representation of a method 400 of managing an overlapping coverage area provided by directional antennas in accordance with some implementations. In various implementations, the method 400 is performed by a multiple endpoint power level orchestrator, such as the multiple endpoint power level orchestrator 130 in FIG. 1C or the multiple endpoint power level orchestrator 230 in FIG. 2. In some implementations, the method 400 is performed by an RRM system residing at one or more endpoint devices. In some implementations, some portions of the method 400 are performed at a multiple endpoint power level orchestrator while other portions are performed at one or more endpoint devices. Briefly, the method 400 includes utilizing collision reports and receive power information in order to reduce excessive coverage overlap provided by endpoint devices.

To that end, as represented by block 410, the method 400 includes assigning a first group identifier to a first endpoint device (e.g., the first endpoint device 101-1 in FIG. 1C) and assigning a second group identifier to a second endpoint device (e.g., the second endpoint device 101-2 in FIG. 1C). As represented by block 410a, in various implementations, the first and/or second group identifiers include 802.11 ax information. For example, in some implementations, first and/or second group identifiers include corresponding color identifiers within a basic service set (BSS) packet, such as red and blue.

As represented by block 420, in various implementations, the method 400 includes instructing the first and second endpoint devices to provide at least respective portions of the first and second coverage areas via one or more common wireless channels (e.g., having the same frequency characteristic). This perturbation of the first and second endpoint devices induces client devices in the overlapping coverage area to generate collision reports. These collision reports may then be used to calibrate the amount of respective coverage overlap (e.g., by changing the transmission power level of the endpoint devices) according to various implementations.

As represented by block 430, the method 400 includes obtaining a first collision report including the first group identifier from the first endpoint device and obtaining a second collision report including the second group identifier from the second endpoint device. As represented by block 430a, in various implementations, the first and/or second collision reports include 802.11ax information. For example, in some implementations, first and/or second collision reports include corresponding BSS color collision reports.

As represented by block 440, in various implementations, the method 400 includes obtaining receive power information. The receive power information is indicative of corresponding strengths of signals received at client devices in the overlapping coverage area from endpoint devices. As represented by block 440a, in various implementations, the respective receive power information is obtained from respective client devices, which previously measured the receive power. As represented by block 440b, in various implementations, respective retry request rate information is obtained from the first and second endpoint devices. The retry request rate is indicative of (e.g., inversely proportional to) the receive power at the client devices.

As represented by block 450, the method 400 includes providing respective transmission power level adjustments to one or more of the first or second endpoint devices until a performance metric is satisfied. As represented by block 450a, in various implementations, the performance metric is satisfied when collision information and receive power information collectively satisfy a coverage area condition, wherein the collision information is included within the first and second collision reports. As represented by block 450b, in some implementations, the coverage area condition is satisfied when the collision information satisfies a collision threshold and the receive power information satisfies a receive power threshold. For example, in some implementations, the coverage area condition is satisfied when the number of collisions per client device over a period of time is below a threshold number while the average receive power per client devices over the period of time is above a threshold number. As another example, in some implementations, the coverage area condition is satisfied when no client device in the overlapping coverage area individually: generates a number of collisions above a first threshold and/or has an average receive power below a second threshold over a period of time.

As represented by block 450c, in some implementations, the respective transmission power level adjustments provided to one or more of the first or second endpoint devices correspond to respective transmission power level reductions. A reduction in the transmission power level of a particular endpoint device results in a reduced coverage area provided by that particular endpoint device. This is desirable when the particular endpoint device and one or more other endpoint devices proximate thereto are providing an excessively strong overlapping coverage area to one more client devices.

As represented by block 450d, in some implementations, providing the respective transmission power level adjustments to one or more of the first or second endpoint devices includes iteratively providing the respective transmission power level reduction adjustments to the first and second endpoint devices. For example, iteratively providing the respective transmission reductions includes alternately providing the respective transmission power level reductions between the first and second endpoint devices. As another example, iteratively providing the respective transmission power level reductions includes concurrently providing the respective transmission power level reductions to the first and second endpoint device. As another example, iteratively providing the respective transmission power level reductions includes a combination of alternately and concurrently providing the respective transmission power level reductions.

As represented by block 460, in some implementations, in response to satisfaction of the performance metric, the method 400 includes instructing the first and second endpoint devices to provide the respective portions of the first and second coverage areas via different wireless channels. In other words, after setting the amount of coverage overlap to a desirable level, the multiple endpoint power level orchestrator instructs the first and second endpoint devices to change the respective coverages provided by one or more common wireless channels to one or more different wireless channels. As a result, the client devices generate fewer collision reports due to less co-channel interference.

Figure 5:
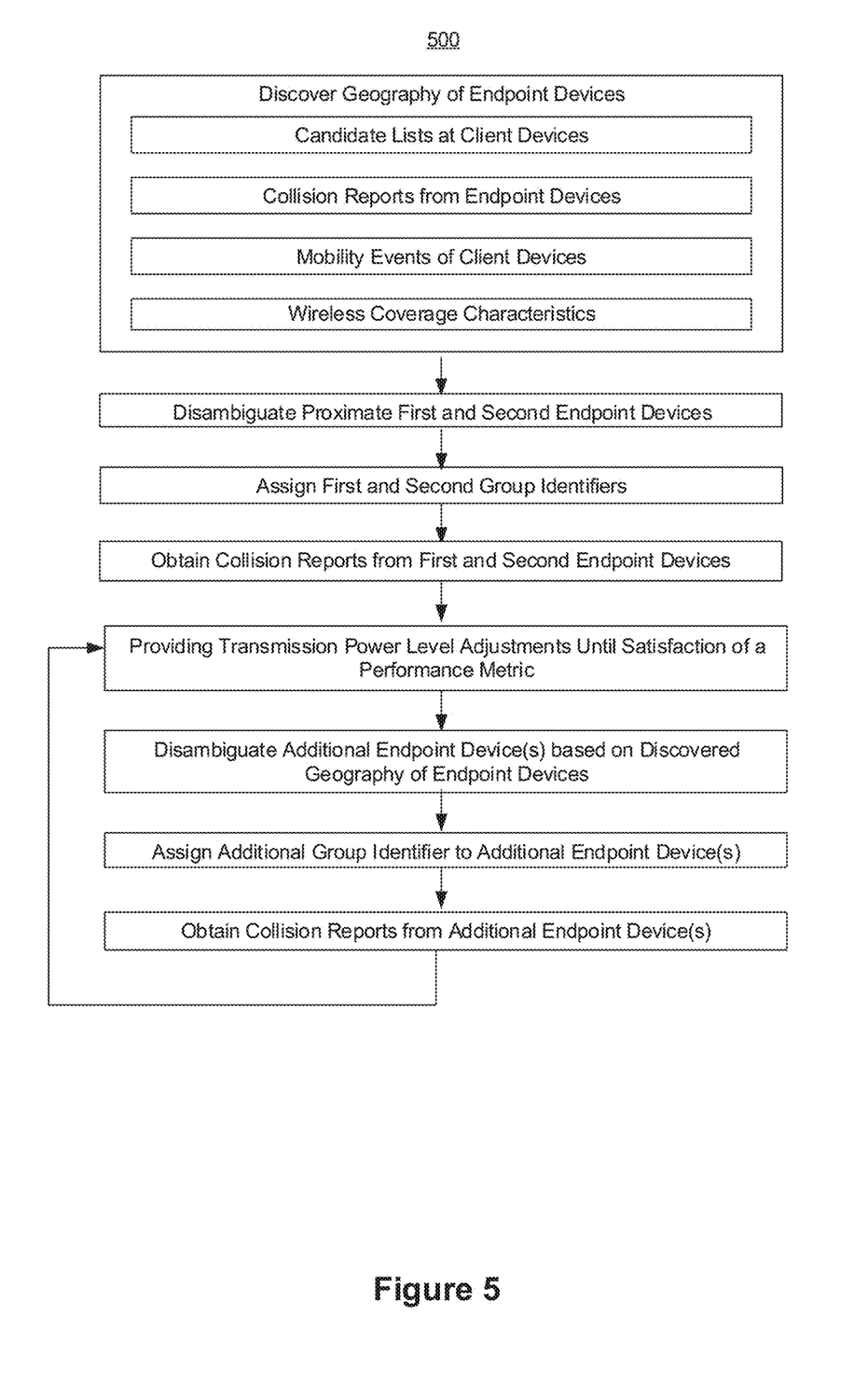
FIG. 5 is a flowchart representation of a method of managing an overlapping coverage area provided by directional antennas in accordance with some implementations.

FIG. 5 is a flowchart representation of a method 500 of managing an overlapping coverage area provided by directional antennas in accordance with some implementations. In various implementations, the method 500 is performed by a multiple endpoint power level orchestrator, such as the multiple endpoint power level orchestrator 130 in FIG. 1C or the multiple endpoint power level orchestrator 230 in FIG. 2. In some implementations, the method 500 is performed by an RRM system residing at one or more endpoint devices. In some implementations, some portions of the method 500 are performed at a multiple endpoint power level orchestrator while other portions are performed at one or more endpoint devices. Briefly, the method 500 includes disambiguating proximate endpoint devices from each other and iteratively adjusting respective transmission power levels of at least a subset of the disambiguated proximate endpoint devices.

To that end, as represented by block 510, in some implementations, the method 500 includes discovering a plurality of proximate endpoint devices including the first and second endpoint devices. For example, with reference to FIG. 2, the multiple endpoint power level orchestrator 230 discovers a subset of the endpoint devices 101-1-101-N.

As represented by block 510a, in some implementations, discovering the plurality of the proximate endpoint devices is constrained by respective endpoint candidate lists generated at one or more client devices in the overlapping coverage area.

As represented by block 510b, in some implementations, discovering the plurality of the proximate endpoint devices is constrained by one or more of the first collision report or the second collision report. For example, in some implementations, the collision reports corresponds to 802.11ax collision reports (e.g., BSS collision reports).

As represented by block 510c, in some implementations, discovering the plurality of the proximate endpoint devices is constrained by mobility event data associated with one or more client devices in the overlapping coverage area. The mobility event data is indicative of the proximity of endpoint devices to one another. For example, a particular client devices changing association between two endpoint devices within a short period of time indicates that the two endpoint devices are proximate to each other. In some implementations, the mobility event data includes the roaming history of one or more client devices with respect to proximate endpoint devices providing the overlapping coverage area.

As represented by block 510d, in some implementations, discovering the plurality of the proximate endpoint devices is constrained by first and second wireless coverage characteristics characterizing with the first and second coverage areas. In some implementations, the coverage characteristics are indicative of degradation of performance at respective endpoint devise. For example, with reference to FIG. 2, the power level orchestrator device 230 obtains beacon reports and/or neighbor report information elements from one or more client devices, such as a number of mobile phones. For instance, a particular endpoint device with a high loss rate suggests or indicates that the particular endpoint device is proximate to other endpoint devices. The other endpoint devices may be providing connectivity to client devices via the same channel by which the particular endpoint device is providing connectivity.

As represented by block 520, in some implementations, the method 500 includes disambiguating the plurality of proximate endpoint devices from each other.

As represented by block 530, in some implementations, the method 500 includes selecting, from the plurality of proximate endpoint devices, the first and second endpoint devices.

As represented by block 540, the method 500 includes assigning a first group identifier to a first endpoint device and assigning a second group identifier to a second endpoint device.

As represented by block 550, the method 500 includes obtaining a first collision report including the first group identifier from the first endpoint device and obtaining a second collision report including the second group identifier from the second endpoint device.

As represented by block 560, the method 500 includes providing respective transmission power level adjustments to one or more of the first or second endpoint devices according to satisfaction of a performance metric.

As represented by block 570, in some implementations, the method 500 includes selecting, from the plurality of proximate endpoint devices, one or more additional endpoint devices.

As represented by block 580, in some implementations, the method 500 includes assigning a respective group identifier to the one or more additional endpoint devices.

As represented by block 590, in some implementations, the method 500 includes obtaining a respective collision report including the respective group identifier from the one or more additional endpoint devices. In some implementations, the method 500 proceeds back to block 560, wherein further transmission power level adjustments are made according to satisfaction of the performance metric.

Figure 6:
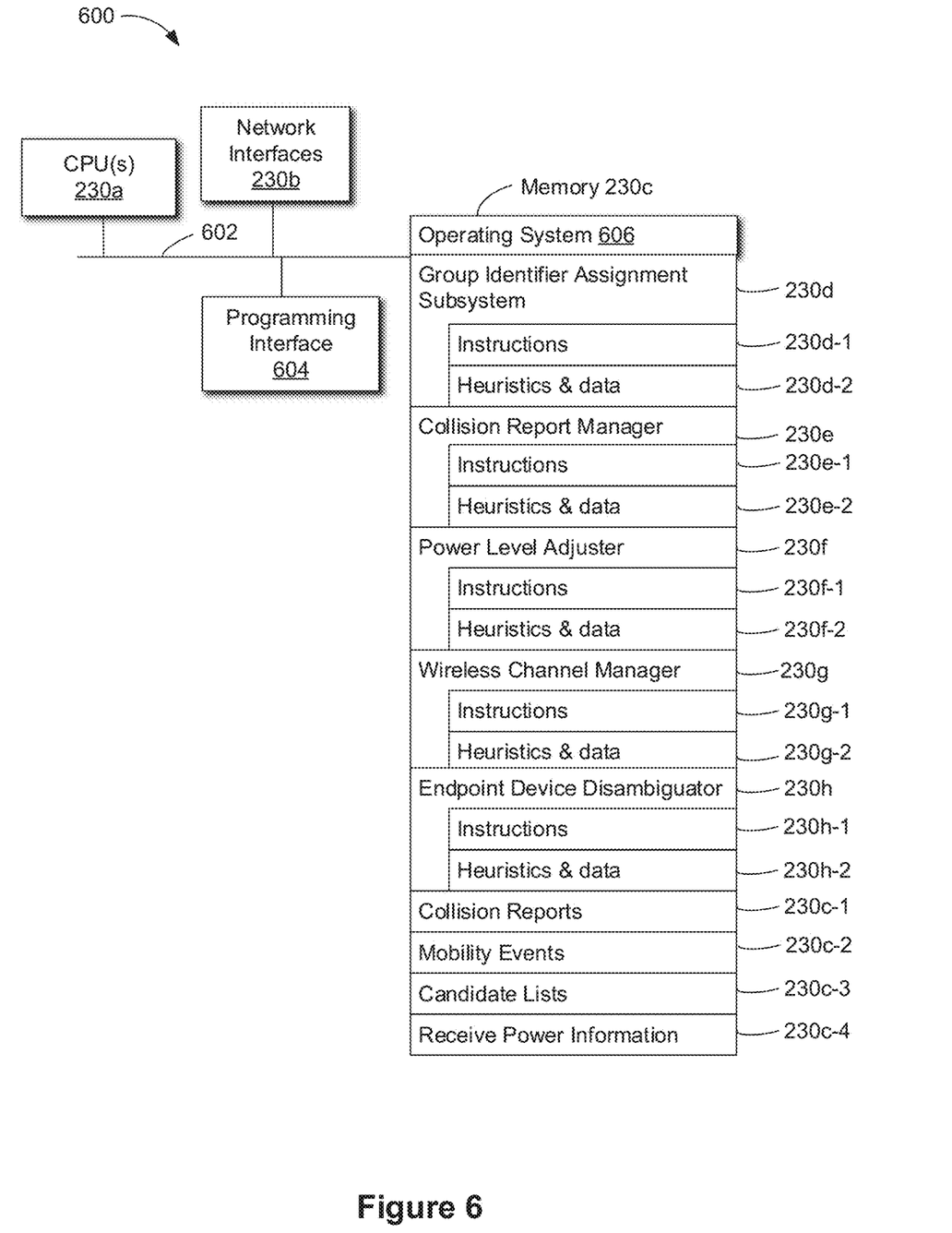
FIG. 6 is a block diagram of an example of a multiple endpoint power level orchestrator in accordance with some implementations.

FIG. 6 is a block diagram of an example of a multiple endpoint power level orchestrator 600 in accordance with some implementations. In some implementations, the multiple endpoint power level orchestrator 600 is similar to and adapted from the attestation routing orchestrator 101 in FIG. 4. In some implementations, the multiple endpoint power level orchestrator 600 is similar to and adapted from the multiple endpoint power level orchestrator 230 in FIG. 2 and/or the multiple endpoint power level orchestrator 130 in FIG. 1C. While certain specific features are illustrated, those skilled in the art will appreciate from the present disclosure that various other features have not been illustrated for the sake of brevity, and so as not to obscure more pertinent aspects of the implementations disclosed herein.

To that end, as a non-limiting example, in some implementations the multiple endpoint power level orchestrator 600 includes one or more processing units (CPU's) 230a, a network interface 501c, a memory 230c, a programming (I/O) interface 604, and one or more communication buses 602 for interconnecting these and various other components.

In some implementations, the one or more communication buses 602 include circuitry that interconnects and controls communications between system components. The memory 230c includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 230c optionally includes one or more storage devices remotely located from the CPU(s) 230a. The memory 230c includes a non-transitory computer readable storage medium. In some implementations, the memory 230c or the non-transitory computer readable storage medium of the memory 230c stores the following programs, modules and data structures, or a subset thereof including an optional operating system 606, a group identifier assignment subsystem 230d, a collision report manager 230e, a power level adjuster 230f, a wireless channel manager 230g, an endpoint device discovery subsystem 230h, an endpoint device disambiguator 230i, a collision reports datastore 230c-1, a mobility events datastore 230c-2, a candidate lists datastore 230c-3, and a receive power information datastore 230c-4.

The operating system 606 includes procedures for handling various basic system services and for performing hardware dependent tasks.

In some implementations, the group identifier assignment subsystem 230d is configured to assign a first group identifier to a first endpoint device and assign a second group identifier to a second endpoint device. To that end, in various implementations, the group identifier assignment subsystem 230d includes instructions and/or logic 230d-1 and heuristics and metadata 230d-2.

In some implementations, the collision report manager 230e is configured to obtain a first collision report including the first group identifier from the first endpoint device and obtain a second collision report including the second group identifier from the second endpoint device. To that end, in various implementations, the collision report manager 230e includes instructions and/or logic 230e-1 and heuristics and metadata 230e-2.

In some implementations, the power level adjuster 230f is configured to provide respective transmission power level adjustments to one or more of the first or second endpoint devices according to satisfaction of a performance metric. To that end, in various implementations, the power level adjuster 230f includes instructions and/or logic 230f-1 and heuristics and metadata 230f-2.

In some implementations, the wireless channel manager 230g is configured to instruct the first and second endpoint devices to provide at least respective portions of the first and second coverage areas via one or more common wireless channels. In some implementations, the wireless channel manager 230g is configured to, in response to satisfaction of the performance metric, instruct the first and second endpoint devices to provide the respective portions of the first and second coverage areas via different wireless channels. To that end, in various implementations, the wireless channel manager 230g includes instructions and/or logic 230g-1 and heuristics and metadata 230g-2.

In some implementations, the endpoint device discovery subsystem 230h is configured to discover a plurality of proximate endpoint devices including the first and second endpoint devices. To that end, in various implementations, the endpoint device discovery subsystem 230h includes instructions and/or logic 230h-1 and heuristics and metadata 230h-2.

In some implementations, the endpoint device disambiguator 230i is configured to disambiguate the plurality of proximate endpoint devices from each other. In some implementations, the endpoint device disambiguator 230i is configured select, from the plurality of proximate endpoint devices, the first and second endpoint devices. To that end, in various implementations, the endpoint device disambiguator 230i includes instructions and/or logic 230i-1 and heuristics and metadata 230i-2.

Although the group identifier assignment subsystem 230d, the collision report manager 230e, the power level adjuster 230f, the wireless channel manager 230g, the endpoint device discovery subsystem 230h, the endpoint device disambiguator 230i, the collision reports datastore 230c-1, the mobility events datastore 230c-2, the candidate lists datastore 230c-3, and the receive power information datastore 230c-4 are illustrated as residing on a single device (e.g., the multiple endpoint power level orchestrator 600), it should be understood that in other implementations, any combination of the aforementioned subsystems may reside at separate computing devices.

Moreover, FIG. 6 is intended more as functional description of the various features which may be present in a particular embodiment as opposed to a structural schematic of the implementations described herein. As recognized by those of ordinary skill in the art, items shown separately could be combined and some items could be separated. For example, some functional modules shown separately in FIG. 6 could be implemented in a single module and the various functions of single functional blocks could be implemented by one or more functional blocks in various implementations. The actual number of modules and the division of particular functions and how features are allocated among them will vary from one embodiment to another, and may depend in part on the particular combination of hardware, software, and/or firmware chosen for a particular embodiment.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first signal characteristic, and, similarly, a second signal characteristic could be termed a first signal characteristic, which changing the meaning of the description, so long as all occurrences of the "first signal characteristic" are renamed consistently and all occurrences of the "second signal characteristic" are renamed consistently. The first signal characteristic and the second signal characteristic are both signal characteristics, but they are not the same signal characteristic.

The terminology used herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
    at a multiple endpoint power level orchestrator in communication with a first endpoint device that includes a first directional antenna and a second endpoint device that includes a second directional antenna, the first directional antenna providing a first coverage area and the second directional antenna providing a second coverage area, wherein the first and second coverage areas provide an overlapping coverage area:
        discovering a plurality of proximate endpoint devices including the first endpoint device and the second endpoint device based on a roaming history of one or more client devices in the overlapping coverage area;
        assigning a first group identifier to the first endpoint device and assigning a second group identifier to the second endpoint device;
        obtaining a first collision report including the first group identifier from the first endpoint device and obtaining a second collision report including the second group identifier from the second endpoint device, wherein the first collision report and the second collision report are indicative of the first and second directional antennas providing the overlapping coverage area via one or more common wireless channels; and
        providing respective transmission power level adjustments to one or more of the first or second endpoint devices according to a satisfaction of a performance metric.

2. The method of claim 1, wherein discovering the plurality of the proximate endpoint devices includes discovering the plurality of the proximate endpoint devices based on one or more of the first collision report or the second collision report.

3. The method of claim 1, wherein discovering the plurality of the proximate endpoint devices includes discovering the plurality of the proximate endpoint devices based on first and second wireless coverage characteristics characterizing with the first and second coverage areas.

4. The method of claim 1, wherein discovering the plurality of the proximate endpoint devices includes discovering the plurality of the proximate endpoint devices based on respective endpoint candidate lists generated at the one or more client devices in the overlapping coverage area.

5. The method of claim 1, further comprising:
    disambiguating the plurality of proximate endpoint devices from each other; and
    selecting, from the plurality of proximate endpoint devices, the first and second endpoint devices.

6. The method of claim 5, further comprising:
    selecting, from the plurality of proximate endpoint devices, a third endpoint device;
    assigning a third group identifier to the third endpoint device;
    obtaining a third collision report including the third group identifier from the third endpoint device; and
    providing the respective transmission power level adjustments to one or more of the first endpoint device; the second endpoint device; or the third endpoint device according to the satisfaction of the performance metric.

7. The method of claim 1, further comprising:
    obtaining, from the first and second endpoint devices, respective channel characteristics;
    wherein providing the respective transmission power level adjustments to the one or more of the first or second endpoint devices according to the satisfaction of the performance metric is in response to determining that the respective channel characteristics satisfy an endpoint device degradation metric.

8. The method of claim 1, further comprising:
    instructing the first and second endpoint devices to provide at least respective portions of the first and second coverage areas via the one or more common wireless channels.

9. The method of claim 8, further comprising, in response to the satisfaction of the performance metric, instructing the first and second endpoint devices to provide the respective portions of the first and second coverage areas via different wireless channels.

10. The method of claim 1, wherein the performance metric is satisfied when collision information and receive power information collectively satisfy a coverage area condition, wherein the collision information is included within the first and second collision reports, and wherein the receive power information is indicative of respective strengths of signals received at the one or more client devices in the overlapping coverage area.

11. The method of claim 10, wherein the coverage area condition is satisfied when the collision information satisfies a collision threshold and the receive power information satisfies a receive power threshold.

12. The method of claim 10, wherein the receive power information is indicated by retry request rate information obtained from the first and second endpoint devices.

13. The method of claim 1, wherein the respective transmission power level adjustments to the one or more of the first or second endpoint devices correspond to respective transmission power level reductions.

14. The method of claim 13, wherein providing the respective transmission power level adjustments to the one or more of the first or second endpoint devices includes iteratively providing the respective transmission power level reductions to the first and second endpoint devices.

15. A multiple endpoint power level orchestrator, comprising:
    a non-transitory memory;
    one or more processors;
    a network interface configured to communicate with a first endpoint device that includes a first directional antenna and a second endpoint device that includes a second directional antenna, the first directional antenna providing a first coverage area and the second directional antenna providing a second coverage area, wherein the first and second coverage areas provide an overlapping coverage area;
    an endpoint device discovery subsystem configured to discover a plurality of proximate endpoint devices including the first endpoint device and the second endpoint device based on a roaming history of one or more client devices in the overlapping coverage area;
    a group identifier assignment subsystem configured to assign a first group identifier to the first endpoint device and assign a second group identifier to the second endpoint device;
    a collision report manager configured to obtain a first collision report including the first group identifier from the first endpoint device and obtain a second collision report including the second group identifier from the second endpoint device, wherein the first collision report and the second collision report are indicative of the first and second directional antennas providing the overlapping coverage area via one or more common wireless channels; and
    a power level adjuster configured to provide respective transmission power level adjustments to one or more of the first or second endpoint devices according to a satisfaction of a performance metric.

16. The multiple endpoint power level orchestrator of claim 15, further configured to:
    obtain, from the first and second endpoint devices, respective channel characteristics, wherein the power level adjuster is configured to provide the respective transmission power level adjustments to the one or more of the first or second endpoint devices according to the satisfaction of the performance metric in response to determining that the respective channel characteristics satisfy an endpoint device degradation metric.

17. The multiple endpoint power level orchestrator of claim 15, further comprising:
    a wireless channel manager configured to instruct the first and second endpoint devices to provide at least respective portions of the first and second coverage areas via the one or more common wireless channels.

18. A non-transitory computer readable storage medium storing instructions, which, when executed by one or more processors of a multiple endpoint power level orchestrator in communication with a first endpoint device that includes a first directional antenna and a second endpoint device that includes a second directional antenna, the first directional antenna providing a first coverage area and the second directional antenna providing a second coverage area, wherein the first and second coverage areas provide an overlapping coverage area, cause the multiple endpoint power level orchestrator to:
    discover a plurality of proximate endpoint devices including the first endpoint device and the second endpoint device based on a roaming history of one or more client devices in the overlapping coverage area;
    assign a first group identifier to the first endpoint device and assigning a second group identifier to the second endpoint device;
    obtain a first collision report including the first group identifier from the first endpoint device and obtaining a second collision report including the second group identifier from the second endpoint device, wherein the first collision report and the second collision report are indicative of the first and second directional antennas providing the overlapping coverage area via one or more common wireless channels; and
    provide respective transmission power level adjustments to one or more of the first or second endpoint devices according to a satisfaction of a performance metric.

19. The non-transitory computer readable storage medium of claim 18, wherein the instructions further cause the multiple endpoint power level orchestrator to:
    obtain, from the first and second endpoint devices, respective channel characteristics; and
    provide the respective transmission power level adjustments to the one or more of the first or second endpoint devices according to the satisfaction of the performance metric in response to determining that the respective channel characteristics satisfy an endpoint device degradation metric.

20. The non-transitory computer readable storage medium of claim 18, wherein the instructions further cause the multiple endpoint power level orchestrator to:
    instruct the first and second endpoint devices to provide at least respective portions of the first and second coverage areas via the one or more common wireless channels.

* * * * *